United States Patent [19]

Robock et al.

[11] 3,868,223

[45] Feb. 25, 1975

[54] MEASURING DEVICE FOR MEASURING THE OXYGEN CONSUMPTION OF BIOLOGICAL SUBSTANCES

[75] Inventors: Klaus Robock; Ullrich Teichert, both of Essen; Paul Gerhard Munder, Emmendingen, all of Germany

[73] Assignee: Bergwerksverband GmbH, Essen, Germany

[22] Filed: Feb. 16, 1973

[21] Appl. No.: 333,150

[30] Foreign Application Priority Data

Feb. 18, 1972 Germany.............................. 2207615

[52] U.S. Cl............. 23/253 R, 23/230 B, 195/127, 204/195 B, 204/195 P
[51] Int. Cl....................... G01n 27/46, G01n 33/16
[58] Field of Search .......... 23/254 R, 254 E, 253 R, 23/253 A, 230 B; 204/195 B, 195 P; 195/109, 127, 142

[56] References Cited
UNITED STATES PATENTS

| | | | |
|---|---|---|---|
| 2,913,386 | 11/1959 | Clark................................ | 204/195 P |
| 3,088,905 | 5/1963 | Glover............................... | 204/195 P |
| 3,112,999 | 12/1963 | Grosskopf........................... | 23/254 R |
| 3,149,921 | 9/1964 | Warner.............................. | 23/254 E |
| 3,367,850 | 2/1968 | Johnson............................. | 23/254 R |
| 3,545,931 | 12/1970 | McKinley........................... | 23/232 R |
| 3,607,084 | 9/1971 | Mackey............................. | 23/254 E |
| 3,718,434 | 2/1973 | Pierce............................... | 23/254 R |

Primary Examiner—Morris O. Wolk
Assistant Examiner—Sidney Marantz
Attorney, Agent, or Firm—Michael S. Striker

[57] ABSTRACT

Two chambers are provided of which one is to contain an oxygen-consuming substance and the other is to have oxygen introduced into it. The two chambers are separated from one another by a gas-permeable membrane and oxygen can pass through the latter. A measuring unit measures the oxygen content in the oxygen-containing chamber so as to determine the consumption of oxygen by the substance in the other chamber.

10 Claims, 1 Drawing Figure

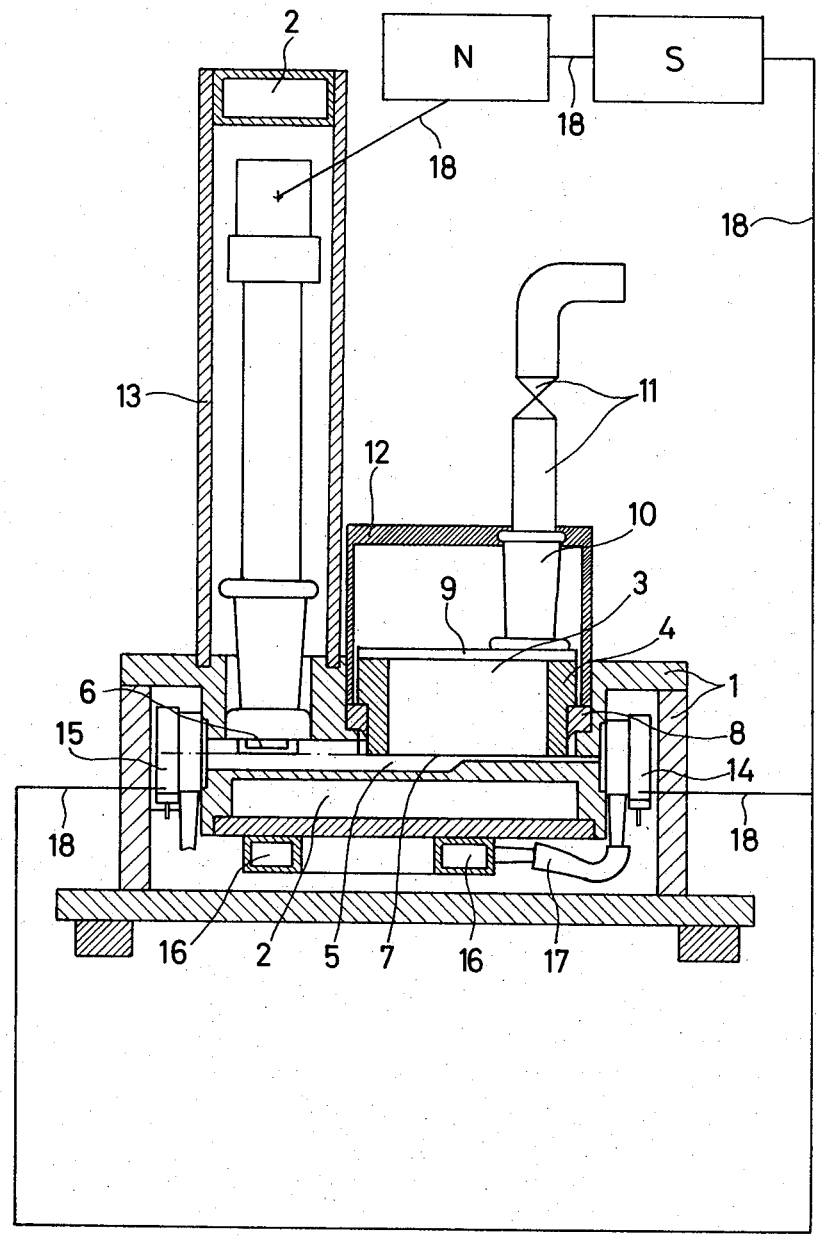

MEASURING DEVICE FOR MEASURING THE OXYGEN CONSUMPTION OF BIOLOGICAL SUBSTANCES

BACKGROUND OF THE INVENTION

The present invention relates to a measuring device in general, and more particularly to a device for measuring the consumption of oxygen by a biological substance.

Many biological substances, such as cells, bacteria or tissue, consume oxygen. The rate of oxygen consumption can provide data on various influences affecting the substance, for instance the deleterious or stimulating influence of gases—such as contaminated air, liquid or particulate matter including dust and antibiotics—on the metabolism of the biological substance in question.

To make the necessary measurement it is known in the prior art to admit the biological substance, such as cells or the like into a liquid, such as a biological nutrient fluid, within a culture chamber, and to directly measure the decrease of oxygen content in the liquid—resulting from the oxygen consumption of the biological substance—by having a Clark electrode dip into the liquid and measure the oxygen decrease.

However, this involves certain disadvantages which are objectionable. It is necessary to continuously agitate the liquid, for instance by stirring it, in order to assure that an even distribution of the oxygen in the liquid is achieved and maintained, so as to provide for an optimum supply of oxygen to the biological substance in question. This constant movement of the liquid can in many instances lead to damage of the biological substance itself, and may in some instances not at all be possible for various reasons known to those skilled in the art. Moreover, it is not possible to admit gaseous, liquid or solid matter into the culture chamber once the measuring process has begun, without thereby interfering with the accuracy of the measurements taken.

SUMMARY OF THE INVENTION

Accordingly, it is an object of the present invention to provide an improved measuring device of the type in question which avoids the aforementioned disadvantages.

More particularly it is an object of the invention to provide a measuring device for measuring the oxygen consumption of biological substances which improves the accuracy of measurements obtained and eliminates the danger of damage to the substances in question.

In keeping with these objects and with others which will become apparent hereafter, one feature of the invention resides in a measuring device particularly for measuring the oxygen consumption of biological substances, which briefly stated comprises wall means defining a first chamber adapted to contain an oxygen-consuming substance, and a second chamber communicating with the first chamber. A gas-permeable membrane separates the chambers from one another so as to permit passage of gas between them. An oxygen-measuring electrode is at least in part exposed at the interior of the second chamber so as to measure the oxygen content therein.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawing.

BRIEF DESCRIPTION OF THE DRAWING

The single FIGURE is a somewhat diagrammatic cross-section of a device according to the present invention.

DESCRIPTION OF THE PREFERREDD EMBODIMENTS

Discussing the drawing in detail it will be seen that reference numeral 1 identifies a block of metallic material which can be thermostatically temperature controlled. Reference numeral 2 identifies passages through which a heat-exchange fluid can be circulated. Reference numeral 3 is a hollow which accommodates a culture chamber 4, a gas chamber or space 5 and a Clark electrode 6. Clark electrodes are entirely conventional, being used for measuring the consumption of oxygen, and therefore require no detailed description for those skilled in the art.

The chambers 4 and 5 are separated from one another by a gas-permeable membrane, preferably a TEFLON membrane 7, the term TEFLON being a trademark for a commercially available tetrafluoroethylene product.

The culture chamber 4 in the illustrated embodiment is cylindrical and accommodated in the hollow 3, having a lower opening over which the membrane 7 is tightly placed. A stripper ring 8 has a lip-type seal and is used to provide for an air-tight closure of the gas chamber 5 with respect to the ambient atmosphere. The chamber 4 itselt is air-tightly closed by having a glass plate 9 bonded to the upper open end of the chamber 4.

An inlet 10 is provided, extending through the plate 9, it permits the introduction of microorganisms cells, tissues or other biological substances into the culture chamber 4, after thay have been saturated in a nutrient fluid. An overflow tube 11 is provided which must be removed in order to permit the introduction of material through the inlet 10, and which can be closed by a valve so that the air can be removed from the culture chamber 4 to permit complete filling of the latter with the substance in question. A hood 12, for instance of plexiglas, is provided over the chamber 4 in order to reduce the radiation of heat from the chamber 4 to the ambient surroundings.

A clark electrode 6 is provided which is also accommodated in the block 1 and extends into the gas chamber 5. The element 13 protects the Clark electrode 6 whose temperature is thermostatically controlled via the space 2 through which instance heated water may flow. At the ends of the chamber 5 are provided electromagnetic valves 14 and 15, of which the former serves to admit and the latter to vent oxygen-containing gas.

The Clark electrode 6 is connected via a power supply N(for instance a transformer to permit its connection to houshold current) with a scriber S. Thus, the content of oxygen in the chamber 5 is measured by the Clark electrode 6 and the measurements are recorded by the scriber S which is also well known to those skilled in the art and entirely conventional. If the indicator of the scriber closes a circuit with a previously set contact, as the oxygen content in the chamber 5 decreases, then the valves 14 and 15 are opened via the circuit 18 and oxygen-containing gas is admitted into the chamber 5 from the conduit 16 which contains the gas at slight overpressure relative to the chamber 5 and the supply conduit 17. When the original oxygen content in the chamber 5 has been restored this is indicated by the Clark electrode 6 and the indicator of the scriber which returns to its starting position, whereby the scriber closes another contact in a circuit which closes the two valves 14 and 15.

A thermostat can be provided to control the flow of heat-exchange fluid through the spaces 2, in order to provide for the possibility of carrying out the measurements at a certain desired temperature.

It will be appreciated that the measuring device may utilize several of the chambers 4, 5 and electrodes 6 all of which may be accommodated in one and the same metallic block 1.

The operation of the device will already be understood from what has been described. After the biological substance is admitted into the chamber 4, completely filling the latter, the substance becomes deposited on the gas-permeable membrane 7 and thus has direct contact with the oxygen in the chamber 5. It is not necessary to agitate the liquid content of the chamber 4 because the supply of oxygen to the biological substance resting on the membrane 7 is very good, due to the fact that the path of diffusion between the chamber 5 and the biological substance (namely through the membrane 7) is very short. Because the electrode extends directly into the chamber 5, high sensitivity of the measurements of the constantly varying oxygen content in the gas chamber 5 is obtained. We have found that the Clark electrode provides for exceptionally good and accurate measuring results, but of course other oxygen-measuring elements could be utilized in its place.

Every time the oxygen content in the chamber 5 decreases below a certain level, due to consumption of oxygen by the biological substance, the chamber 5 receives additional oxygen by the oxygen-containing gas which is passed through it via valves 14 and 15, until the initial oxygen content has been restored. Now, a new oxygen-consumption measuring periods begins. The restoration of the oxygen content to the original level takes only a few seconds so that the measurement of oxygen consumption takes place without any significant interruption.

Measurements end when the measuring electrode no longer indicates any oxygen consumption. The total oxygen consumption then is obtained by adding the individual amounts of oxygen consumed during the various measuring periods.

Of course, it is possible for an operator to observe the indications of consumption provided by the Clark electrode and to manually operate the valves 14, 15, for instance by operating a switch which opens or closes these electromagnetic (i.e., solenoid) valves. However, the automatic operation which has been described above is evidently more advantageous.

When the measuring operation is to begin, then an oxygen-containing gas such as air is admitted into the chamber 5, and the indicator of the instrument connected with the Clark electrode then shows that a certain voltage (for instance approximately 0.8 volts) is applied to the electrode in accordance with the oxygen content in the chamber 5, and that the measuring instrument measures the current strength which depends upon the oxygen content in the chamber 5. If the oxygen content in the chamber 5 is consumed by the substance in the chamber 4, then the pointer of the measuring instrument, which advantageously is a scriber as pointed out before, and which may be a millivoltmeter or a galvanometer, will move accordingly. Generally speaking, the oxygen content in the chamber 5 should not decrease below approximately 16 percent to prevent damage to the biological substance as a result of oxygen starvation. Therefore, with the automatic arrangement described above one of the contacts for controlling the valves 14 and 15 can be set to a value which corresponds to a decrease of the oxygen content in the chamber 5 to between 20 and 16 percent. Thus, when the moving pointer of the scriber S reaches this contact, it closes a circuit which results in the automatic opening of the valves 14, 15 and the admission of additional oxygen-containing gas into the chamber until the original level of oxygen content therein has been restored, which takes only a few seconds. Then the pointer of the scriber S returns to its rest position, interrupting the circuit by engaging a second contact and thereby closing the valves 14, 15.

Of course, oxygen-containing gas other than air can be utilized, in which case the numerical values for oxygen content in the chamber 5, which have been mentioned above, may vary appropriately.

It is also clear that it is not necessary that the wall means accommodating the chambers 4, 5 and the electrode 6 be in form of a metallic block 1, as illustrated. Another appropriate housing can be utilized.

It will be understood that each of the elements described above, or two or more together, may also find a useful application in other types of constructions differing from the types described above.

While the invention has been illustrated and described as embodied in a measuring device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various modifications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A measuring device for measuring the oxygen consumption of biological substances, comprising wall means defining a first chamber adapted to contain an oxygen-consuming substance, and a second chamber for containing gaseous oxygen and communicating with said first chamber; a gas-permeable membrane separating said chambers from one another so as to permit passage of gas between them; an oxygen measuring electrode which is at least in part exposed at the interior of said second chamber for measuring the oxygen content therein and providing electric signals indicative of the oxygen content; and means connected with said electrode for controlling the oxygen content in said second chamber as a function of the electrical signals received from said electrode.

2. A measuring device as defined in claim 1, wherein said electrode is a Clark electrode.

3. A measuring device as defined in claim 1, further comprising a scriber in circuit with said electrode for providing a record of the oxygen content-measurements of said electrode.

4. A measuring device as defined in claim 1, wherein said wall means comprises a metallic block having said chambers at least in part formed therein; and further comprising heat-exchange means for maintaining said block at a thermostatically controllable temperature.

5. A measuring device as defined in claim 1, wherein said membrane is a Teflon membrane.

6. A measuring device as defined in claim 1, wherein said wall means comprises a metallic block; and wherein said chambers and said electrode are accommodated in said block.

7. A measuring device as defined in claim 1, wherein said means for controlling the content of oxygen further comprises admitting means and venting means communicating with said second chamber for admitting and venting oxygen therefrom.

8. A measuring device as defined in claim 7, wherein said admitting means and said venting means each comprise an electromagnetic valve; and wherein said electrode is operatively associated with said valves for effecting opening and closing of the same in dependence upon the oxygen content measured in said second chamber.

9. A measuring device as defined in claim 1, wherein said wall means comprises a tubular metallic member of upright orientation and having an upper and a lower end, said membrane extending across and closing said lower open end; and further comprising a glass plate extending across and closing said upper open end.

10. A measuring device as defined in claim 9, and further comprising a removable filler tube extending through an opening in said glass plate and communicating with said first chamber; and a valve in said filler tube.

* * * * *